July 29, 1930.  O. NELSON  1,771,811
TAP AND DIE STOCK
Filed Aug. 22, 1925   2 Sheets-Sheet 1
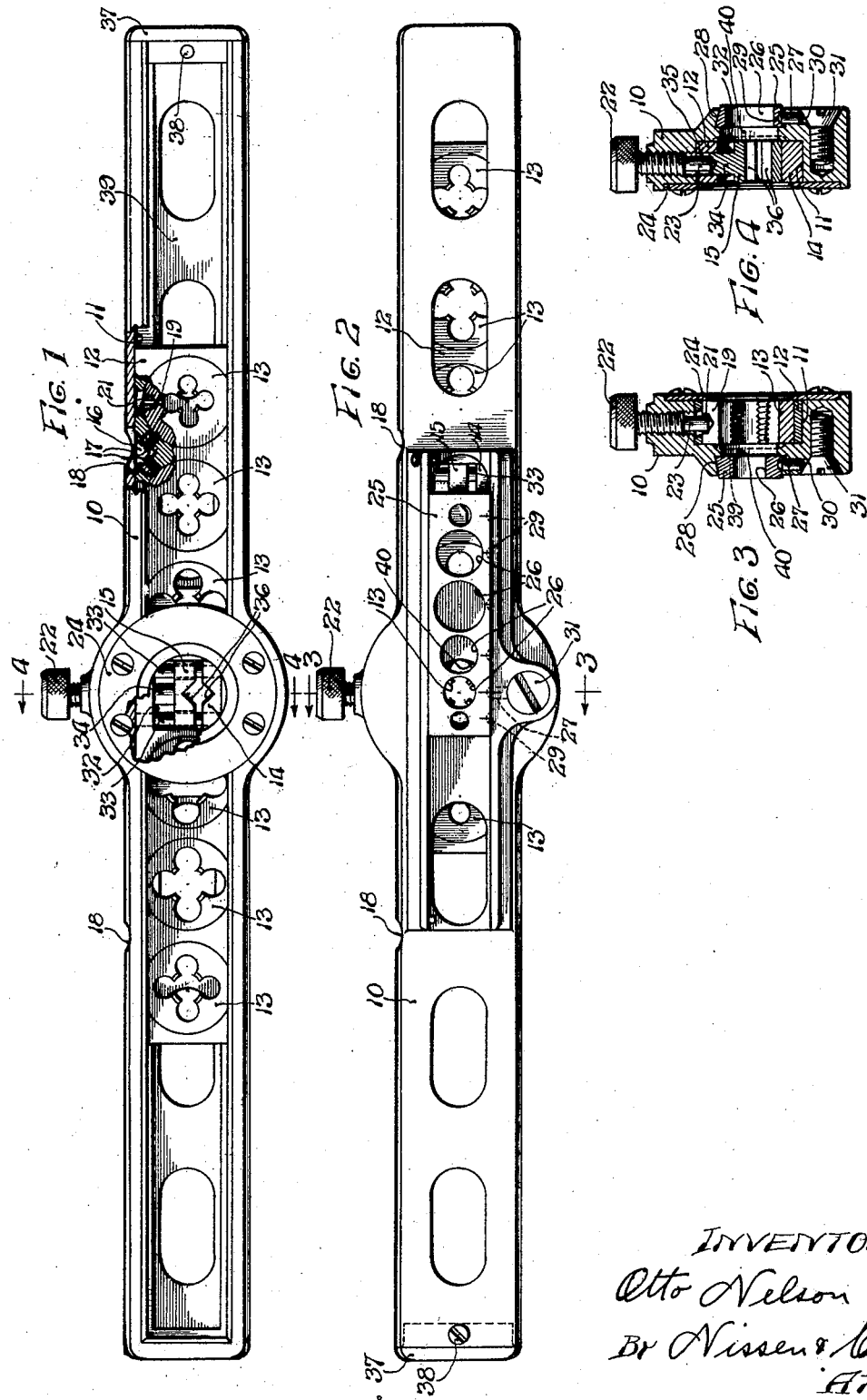

July 29, 1930.                    O. NELSON                    1,771,811
                              TAP AND DIE STOCK
                            Filed Aug. 22, 1925          2 Sheets-Sheet 2

INVENTOR
Otto Nelson
Nissen & Crane
BY                ATTYS.

Patented July 29, 1930

1,771,811

UNITED STATES PATENT OFFICE

OTTO NELSON, OF CHICAGO, ILLINOIS, ASSIGNOR, BY DIRECT AND MESNE ASSIGNMENTS, TO TIME SAVER MFG. COMPANY, A CORPORATION OF ILLINOIS

TAP AND DIE STOCK

Application filed August 22, 1925. Serial No. 51,818.

This invention relates to a threading tool for use in cutting either external or internal threads, and has for its object the provision of a tool which shall be of improved construction and efficient and convenient in operation, and which will effect a saving of time on the part of the workmen.

The invention is exemplified in the combination and arrangement of parts shown in the accompanying drawing and described in the following specification, and it is more particularly pointed out in the appended claims.

In the drawings—

Fig. 1 is a side elevation of a tool showing one embodiment of the present invention;

Fig. 2 is a view of the reverse side of the tool shown in Fig. 1 with the die holder in a different position;

Fig. 3 is a section on line 3—3 of Fig. 2;

Fig. 4 is a section on line 4—4 of Fig. 1;

Figure 5:
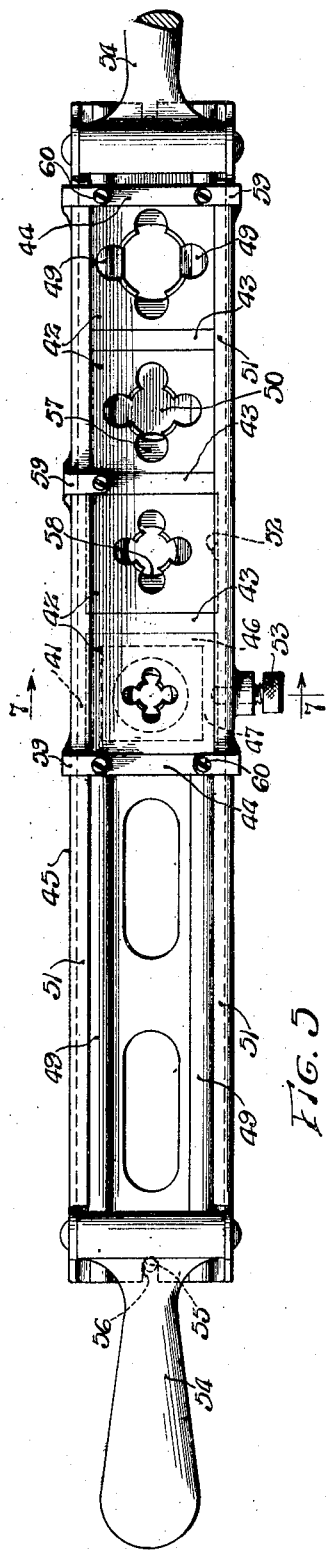
Fig. 5 is a top plan view of a modified form of the invention.

The stock consists of a bar 10 having grooves 11 at opposite sides thereof in which a bar 12 is slidably mounted. The bar 12 is provided with a plurality of transverse openings for receiving dies 13 and a pair of clamping jaws 14 and 15 for clamping the squared end of taps. Between each pair of dies 13 there is provided a notch 16. Screws 17 are threaded through the material of the slide 12 and are arranged with their heads projecting into the notches 16. Openings 18 are provided through the outer edge of the bar 10 to permit the screws 17 to be engaged by a screw driver. The dies 13 are ordinarily split, as shown at 19, and the screws 17 may be caused to bear against the outer peripheries of the dies to adjust the dies and to hold them in place in their sockets. The screws 17 bear frictionally against the dies 13 and do not positively lock them against rotation in their sockets. The dies are only locked when they are moved to bring the openings 21 therein into registration with the knurled screw 22 at the center of the stock. This arrangement prevents a careless workman from attempting to use the die when it is not properly locked at the center of the stock. If an attempt is made to use a die at one side of the center the die will turn in its socket so that it cannot be used for cutting threads.

The holder 12 may be slid in the grooves 11 to bring any one of the series of dies into registration with the openings at the center of the stock, as shown in Figs. 2 and 3. The screw 22 is then turned to bring the end portion 23 thereof into the opening 21 in the die. This spreads the die outwardly against the walls of its socket and against the screws 17 and at the same time locks the die against rotation in the socket. The stock is enlarged at its center and carries a cover plate 24 which overlaps the edge of the die, as shown in Figs. 1 and 3. It will thus be seen that when the die is forced onto the rod to be threaded it will be supported about its entire periphery against the force exerted upon it and will not depend upon the screw 22 for resisting the force exerted by the operator. This arrangement has a decided advantage over dies which are locked in place by a set screw threaded against them at one side. Where the set screw arrangement is used there is a tendency for the die to tip in its socket, throwing it out of true and interfering with the proper threading operation.

At the side of the stock opposite the plate 24 there is arranged a slide bar 25 having openings 26 therein corresponding to the various dies and acting as guides for the rods to be tapped. Flanges 27 retain the slide 25 in place and permit it to be moved longitudinally of the stock to bring the different openings 26 into registration with the center of the stock. The slide 25 is provided with a series of openings 29 which register with a holding pin 30 when the corresponding opening is centrally disposed relatively to the die. A screw 31 may be provided for forcing the pin 30 into the openings 29. It will be understood that any other suitable means may be employed for locking the slide 25 in place and a set screw similar to the screw 22 might be used for this purpose.

In addition to the dies 13 the slide 12 carries a pair of jaws 14 and 15 for holding tapping tools. These jaws are mounted in an opening 32 shown in the illustration as located at the center of the slide 12. The jaws are carried on pins 33, the jaw 14 being tightly fitted to the pins so as to remain fixed at one side of the opening 32, while the jaw 15 is slidably mounted on the pins 33. The jaw 15 carries a stem 34 which projects into an opening 35 in the slide 12 in position to be engaged by the end 23 of the screw 22. By turning the screw 22 the stem 34 may be clamped against a tool shank held in the notches 36 of the jaws 14 and 15.

The stock is provided with a removable cap 37 which is held by a screw 38 at one end of the stock in position to close the slideway formed by the grooves 11. When it is desired to change one of the dies 13 the cap 37 may be removed and the slide 12 withdrawn from the slideways 11 a sufficient distance to permit removal of the particular die or dies. In the ordinary use of the tool it is not necessary to change the dies for threading different sized bolts or rods. The tool carries a complete set of dies of the usual range for which the stock is designed so that in changing from one size to another it is only necessary to release the screw 22 and slide the bar 12 to bring the particular die into registration with the central opening in the plate 24. The screw 22 is then tightened and after the bar 25 has been moved to bring the corresponding guide opening 26 into registration with the center of the tool the tool is ready for use. When it is desired to use a tapping tool the jaws 14 and 15 are brought to the operating position and the tool is clamped between the jaws by the same screw 22 that is used for clamping the dies in position. The dies are always kept in position where they may be readily brought into use and it is not necessary to search through a tool box or go to the tool room when it is desired to procure a die of a different size. The stock may be readily transformed from an outside threading tool to a tapping tool by simply sliding the bar which carries the dies and securing it in proper position.

The elongated die holding bar 12 provides a rigid support for the die with an abundant bearing surface so that the die is firmly held in position. The torque exerted on the stock is transferred to the die block through its elongated bearing faces and the dies are locked in the block by the set screw 22 which spreads the dies in their sockets and holds them from turning. It will be seen from the drawing that the stock 10 is in the form of a channel having a web 39 at one side which connects the flanges forming the guideways 11. The opposite side of the channel is open, except for the plate 24 provided with a central opening arranged to register with the dies when in operating position. The web 39 is provided with a central opening 40 which registers with the opening in the plate 24. The dies are brought into registration with the opening 40 when they are desired for use and the slide 25 is also moved to bring the proper opening 26 into registration with the opening 40.

Figure 6:
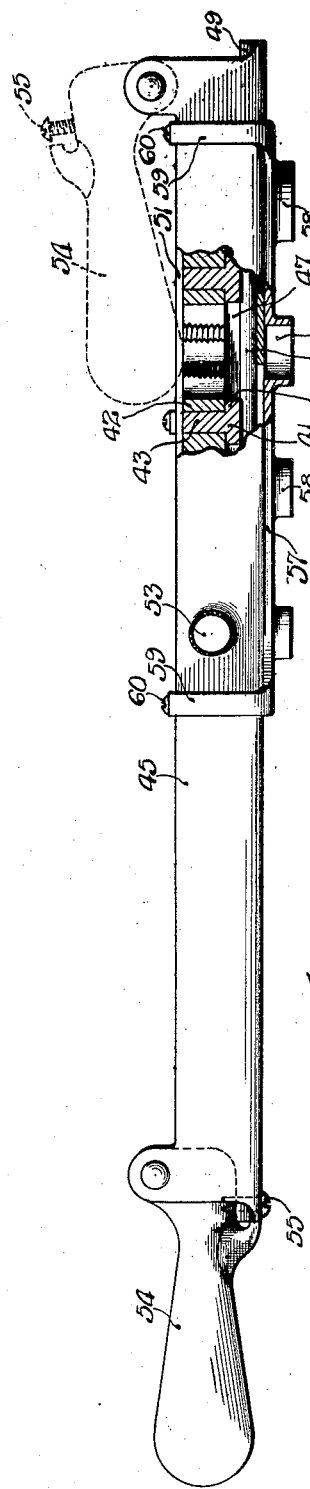
Fig. 6 is an elevation, with parts broken away, of the modification shown in Fig. 5.
Figure 7:
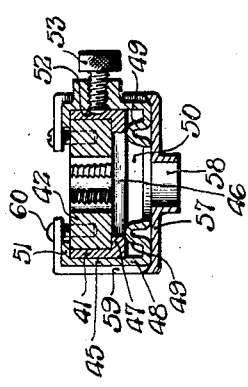
Fig. 7 is a section on line 7—7 of Fig. 5.

In the modification shown in Figs. 5, 6 and 7, a block 41 for holding rectangular dies 42 is provided. This block is provided with recesses separated by partition walls 43 and closed at the end by end walls 44. At the bottom of each recess there is a flange 46 surrounding the recess to provide a seat for the die 42, as shown in Figs. 6 and 7. The recesses for the dies are open at their bottoms, as shown at 47, to permit passage of the rod or pipe to be threaded. This form of the invention is especially applicable to dies for pipe threads.

The block 41 is slidably mounted in a channel member 48 provided with ways 49 on its bottom web along which the block 41 slides. This provides space, as indicated at 50, for receiving the chips from the threaded article and also facilitates the sliding movement of the block in the channel. The top edges of the sides of the channel are bent over, as shown at 51, a sufficient amount to overlap the top edges of the block 41 and also the edges of the dies 42 so that the flanges not only hold the block in its guide, but retain the dies in the block. The side of the block 41 is provided with depressions 52 which register with the centers of the recesses for the dies. A thumb screw 53 is threaded through one side of the channel member 48 in position to engage the depressions 52 and lock the block 41 against sliding movement so as to selectively clamp the dies 42 in their operative position at the middle of the channel member 48. At each end of the channel member 48 there is hinged a handle 54 so that it may be swung into inoperative position shown in broken lines at the right-hand end of Fig. 6, or may be swung into alinement with the channel member 48 for operation, as shown in full lines at the left-hand end of that figure. Screws 55 may be threaded into the handles 54 in position to engage slots 56 in the ends of the bottom web of the handles 54 to hold the handles in their extended or operative position. It will be seen that when the handles are in extended position they will close the end of the channel member 48 to prevent removal of the block 41, but when the handles are folded the ends of the channel are open so that the block may be slid longitudinally from the channel for changing the dies if desired. The folding of the handles permits the die stock to be packed in a much shorter box or case than would otherwise be possible.

A guide member 57 having guide openings 58 therein is supported to slide on the lower face of the channel member and is provided with arms 59 which extend upwardly and are bent inwardly across the flanges 51 and are secured by screws 60 to the slide block 41. The screws 60 may enter the end walls of the slide block and one or more of the partition walls 43. The guide openings 58 correspond with the dies of different sizes for which the stock is designed. It will be seen that when a die is once positioned in a recess corresponding with the proper sized guide opening the guide will remain in registration with the die irrespective of the position of the slide block. This avoids the necessity of adjusting the guide member separately from the adjustment of the dies. The rectangular openings in the slide block provide supports at all sides of the rectangular dies so that they are rigidly held in position for operation. The device is convenient to adjust for different sized dies and may be folded into compact space.

I claim:—

1. A tap and die stock comprising a handle member having a slideway therein, a bar mounted in said slideway, a plurality of dies carried by said bar, a holding member for selectively engaging said dies to lock them in operative position, and a clamp for a tapping tool carried by said bar, said holding member being arranged to engage said clamp to tighten said clamp on a tapping tool.

2. A tap and die stock comprising a handle member having a slideway therein, a block mounted in said slideway, a plurality of dies carried by said block, said handle member having a central opening therein, a set screw carried by said handle member in position to lock said dies in place when disposed in registration with said opening, and a clamping device mounted in said block and movable into registration with said opening, said set screw being arranged to engage said clamping device to clamp the same on the shank of a tool when said clamping device is in registration with said opening.

3. A tap and die stock comprising a channel member having a block slidably mounted therein, a plurality of dies carried by said block, a set screw for selectively engaging said dies to hold said dies in operating position, and a clamping jaw mounted in said block, said clamping jaw being movable into registration with said set screw and arranged to engage said set screw to enable said set screw to operate said clamping jaw.

4. A tap and die holder comprising a channel member having a block slidably mounted therein, dies mounted in said block, screws threaded in said block for engaging said dies to adjust said dies and hold them in position, a set screw for locking said dies in operating position, said block having openings therein to permit said set screw to engage said dies, a pair of clamping jaws mounted in an opening in said block, one of said jaws being arranged to slide relative to the other in said opening, said slidable jaw having a shank thereon projecting into an opening in said block, said set screw being arranged to engage said shank to tighten said jaw upon the shank of a tool, and a second slide block having guide openings therein movable into registration with said dies when said dies are held by said set screw.

5. A die stock comprising a handle having a guideway therein, a block mounted to slide in said guideway, dies mounted in said block, said dies each having an unthreaded opening therein registering with an opening in said block, a holding screw mounted to be selectively received in said openings, and screws for frictionally engaging said dies to hold said dies in position and to dispose said unthreaded openings parallel with the axis of said holding screw, said friction screws preventing the use of the dies not engaged by said holding screw by permitting rotation of said last-mentioned dies.

6. A die stock comprising a handle having a guideway therein, a block mounted to slide in said guideway, dies mounted in said block, said dies each having an unthreaded opening therein registering with an opening in said block, each of said dies having a slit therein extending into said unthreaded opening, a holding screw mounted to be selectively received in said openings, and screws for frictionally engaging said dies to hold said dies in position and to dispose said unthreaded openings parallel with the axis of said holding screw, said friction screws preventing the use of the dies not engaged by said holding screw by permitting rotation of said last-mentioned dies.

In testimony whereof I have signed my name to this specification on this 13th day of August, A. D. 1925.

OTTO NELSON.